G. RIDGWAY.
FILTER FOR SLIMES PULP AND THE LIKE.
APPLICATION FILED FEB. 3, 1912.

1,103,080.

Patented July 14, 1914.
8 SHEETS—SHEET 3.

Witnesses:

Inventor:
George Ridgway

G. RIDGWAY.
FILTER FOR SLIMES PULP AND THE LIKE.
APPLICATION FILED FEB. 3, 1912.

1,103,080.

Patented July 14, 1914.
8 SHEETS—SHEET 5.

Witnesses
Jos Martin
Charles Bucher

Inventor
George Ridgway
by B. Singer
Attorney

G. RIDGWAY.
FILTER FOR SLIMES PULP AND THE LIKE.
APPLICATION FILED FEB. 3, 1912.

1,103,080.

Patented July 14, 1914.
8 SHEETS—SHEET 7.

Witnesses
Jos Martin
Charles Bircher

Inventor
George Ridgway
by B. Singer
Attorney

G. RIDGWAY.
FILTER FOR SLIMES PULP AND THE LIKE.
APPLICATION FILED FEB. 3, 1912.

1,103,080.

Patented July 14, 1914.
8 SHEETS—SHEET 8.

UNITED STATES PATENT OFFICE.

GEORGE RIDGWAY, OF KALGOORLIE, WESTERN AUSTRALIA, AUSTRALIA.

FILTER FOR SLIMES PULP AND THE LIKE.

1,103,080. Specification of Letters Patent. Patented July 14, 1914.

Application filed February 3, 1912. Serial No. 675,322.

*To all whom it may concern:*

Be it known that I, GEORGE RIDGWAY, a subject of His Majesty King George the Fifth, residing at Kalgoorlie, in the State of Western Australia, Commonwealth of Australia, have invented a new and useful Improved Filter for Slimes Pulp and the like, of which the following is a specification.

This invention relates to an automatic slimes filter for the treatment of ores or pulp by means of filtration or similar processes, in which it is necessary to separate the liquid from the solid portion and to wash and discharge the same, the action being automatic and continuous.

This object is attained by certain mechanism whereby filtering frames are immersed in a tank containing the pulp to be filtered. The said immersion is extended over a sufficient period of time to permit of a cake of pulp of the required thickness adhering to the said filtering frames, this adherence being caused by a suction or vacuum being applied to the inside of the filtering frames. The filtering frames are then removed from the pulp tank and immersed in another tank containing water or wash solution as required, the suction or vacuum remaining on the filter frames during this immersion and the period of immersion is sufficiently extended to permit of the pulp being properly washed. After the washing is complete the filtering frames are removed from the wash tank and during their passage back to the pulp tank, certain cocks or valves are brought into contact with mechanism whereby the suction or vacuum connections are closed for a short period and a connection with compressed air is simultaneously opened, thus compressed air is admitted to the filtering frames and dislodges the cakes of pulp from their surfaces into a residue tank and leaves them ready to receive another charge of pulp. The closing of the air valve and the re-opening of the vacuum valves are likewise nearly simultaneous. The solutions are drawn through the vacuum valve and delivered by the vacuum pump where required.

In order that the invention may be more readily understood it will now be described with reference to the accompanying drawings, in which:—

Like reference numerals indicate the same or corresponding parts in all the figures.

The apparatus or filter consists of tanks with agitators to hold gold bearing slimes and wash water; filter frames through which slime is filtered; rocking arms to carry the frames from tank to tank; gear for transmitting power from counter-shafts to rocking arms and agitators; a tank with agitator to reduce residues to a fluid pulp; automatic reversing gear; and suitable devices and pipe connections communicating with and actuating a suitable vacuum pump and compressed air valves.

Figure 15:
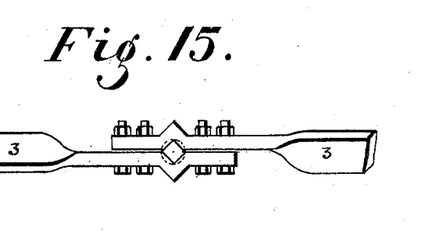
Fig. 15 is a plan view of the agitator blades.
Figures 16, 17, 18:
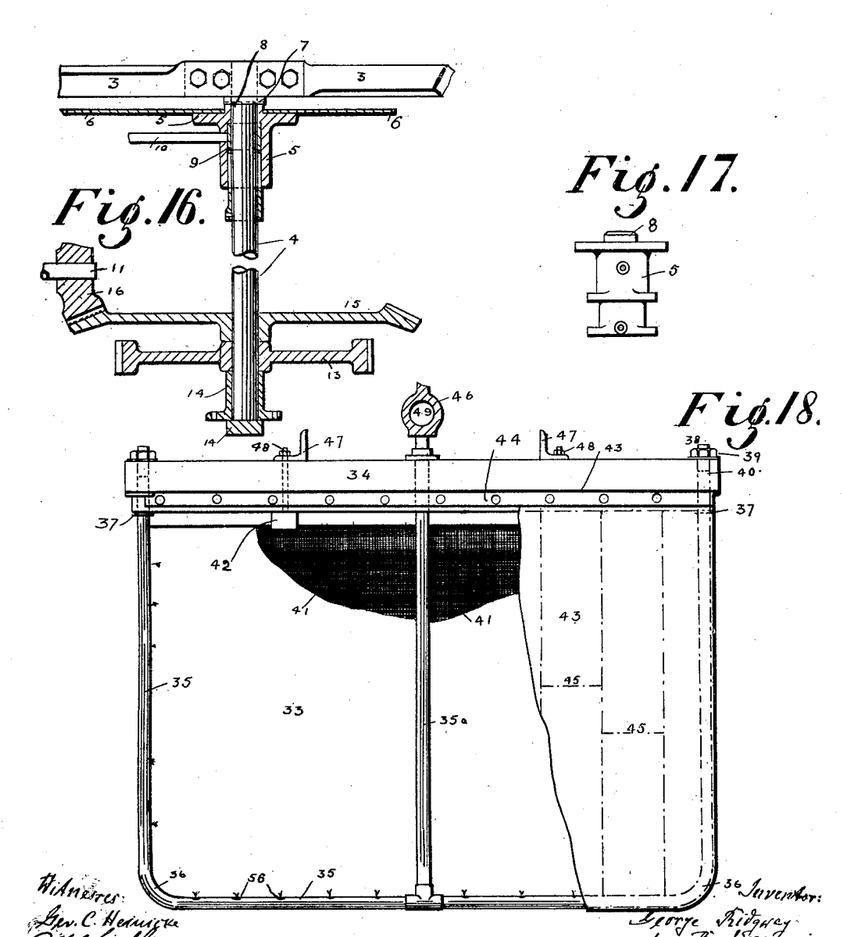
Fig. 16 is a section through the agitator blades and the shaft with the stuffing box and gland.
Fig. 17 is an elevation of the stuffing box and gland.
Fig. 18 is a detail view of one of the filter frames.

The wash and pulp tanks 1 and 1ª respectively are mounted on a frame or retaining wall 2 and are preferably rectangular in shape. These tanks 1 and 1ª are fitted with suitable agitators comprising a pair of agitator blades 3 bolted or otherwise secured to the top of the vertical shaft 4 (Figs. 15, 16 and 17). Stuffing boxes 5 carry the top end of the agitator shafts 4 and all these are securely bolted to the underside 6 of the tanks 1 and 1ª. A square collar 7 is shrunk on to each agitator shaft 4 being cut on its lower side to engage with the beveled top 8 of the stuffing box 5 projecting through the bottom 6 of the tanks 1 and 1ᵃ making an effective joint for keeping grit out of the stuffing box. As an additional precaution the said stuffing box is water packed by means of a perforated ring 9, clean water being connected by a suitable pipe 10 and escapes into the tanks.

The agitators 3 are driven by suitable gear, an intermediate spur wheel 11 on a vertical spindle 12 connecting the two gear wheels 13 on the agitator shafts 4, the bottom ends of the latter being carried in footsteps 14. One agitator shaft 4 in each set is fitted with bevel wheel 15 with bevel pinion 16 on a transverse shaft 17 carried in suitable bearings and passing through an opening in the retaining wall 2; power being transmitted from some convenient outside source to the pulley 18 or the like on the transverse shaft 17. The agitator drive is preferably so arranged that stopping the machine does not stop the agitators.

The level of the pulp and water in each of the tanks 1 and 1ᵃ is maintained by a suitable valve 19 (Fig. 5) having a supply pipe 19ᵃ (Fig. 2) fitted thereto. This valve (wing) is operated by a lever 20, the end of which is pressed by a suitable tappet secured to the filter plate frames and is so arranged that the valve 21 is opened when the filter frames come almost at rest in the tanks 1 and 1ᵃ and is closed immediately when the frames are raised.

Figure 5:
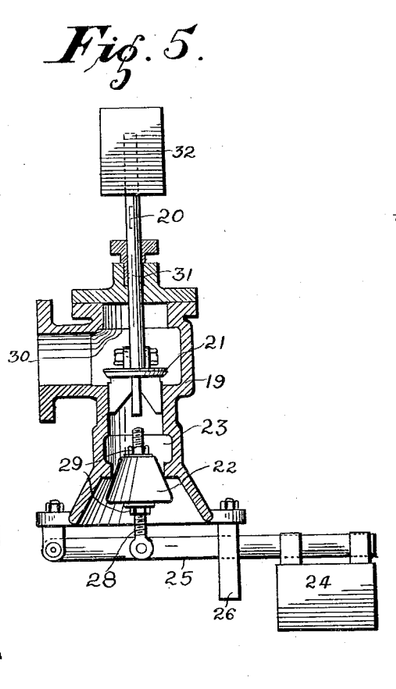
Fig. 5 is a vertical section of the valve employed in maintaining the level of water or pulp in the tanks.

A wooden plug 22 in the lower part or chamber 23 of the valve 19 is connected with a float 24 by means of the hinged arm 25 the movement of the said arm being limited by the guide 26 having a vertical slot within which the said hinged arm 25 moves. The plug 22 may be adjusted by means of the screwed spindle 28 carrying locking nuts 29 and when properly adjusted, will regulate the flow of pulp or water from the source of supply through the upper valve 21 and maintains same at its proper level in the tanks 1 and 1ᵃ.

The pulp or water is supplied to the valve 19 through the inlet orifice 30 and the valve rod 31 is fitted with a suitable weight 32 adapted to facilitate the closing of the valve 21. The valve rod 31 also carries the lever 20 which contacts with the filter frames as above described.

The filter frames 33 are preferably rectangular as illustrated in Fig. 18 and are constructed with a suitable top bar 34 while the remainder of the frames is formed of suitable piping. The pipes 35 are bent at the corners 36 and at the upper end of each pipe 35 a collar 37 is firmly shrunk on. The end 38 of each pipe is screwed and passed through holes in the top bar 34. The two outside pipes or sides 35 of the filter frame 33 are screwed with nuts and washers 39 to the beam 34. The ends of the pipes 35 are hermetically sealed with wooden plugs 40. The pipes 35 are provided with a series of perforations 56 and communication is thus established between the interior of the filter frames and the pipes 35 and 35ᵃ. Two pieces of cocoanut matting 41 are cut to fit loosely between the pipes 35 and of a thickness equal to the pipe diameter, and are securely laced thereto and to clips in the top bar 34.

The filter cloth 43 is composed of any suitable material, such as American duck and is made up in the form of a bag cut to fit tightly over the pipes 35. Any suitable number of filter cloths may be used to obtain the desired thickness. It is secured and a joint made at the top by means of a bar 44 tightly bolted to the top bar 34. The filter cloth and matting are then securely stitched through as at 45 so that the cloth will not belly when compressed air is applied to blow off the cakes.

Figure 3:
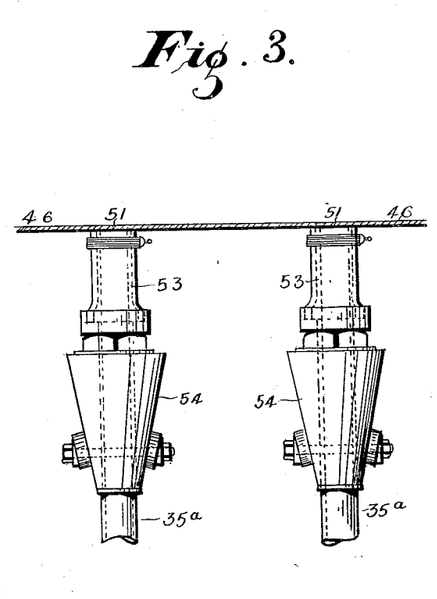
Figs. 3 and 4 are detail views of an essential feature of the invention illustrating means for connecting and suspending the filter frames from a special beam, such also being connections whereby vacuum and compressed air are supplied to the filter frames.
Figure 4:
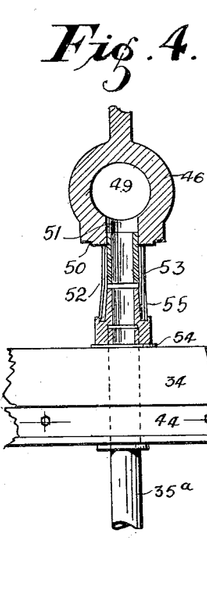

The filter frames 33 are suspended from a beam 46 of special construction and are provided with lugs 47 to which are attached hanger bars 47ᵃ (Fig. 1) carrying two longitudinal angles to which the filter frames 33 are secured by bolts which latter are also used to carry the above mentioned clips 42 by which the cocoanut matting is secured. It is essential that the frames 33 are made with all parts interchangeable so that a spare frame will fit wherever required, and any suitable number may be used. The said beam 46 is cored out to form a pipe 49 and on its underside 50 it is provided with a sufficient number of holes 51 (Figs. 3 and 4) to take solution and give air to the filter frames 33. Each hole 51 is tapped and fitted with a short length of piping 52 to which is securely wired a short length of rubber hose 53 and communicates with the inside of the filter plates 33 through the center pipe 35ᵃ of the filter frame 33 which is fitted with the nipple 54 which acts as a nut to hold the pipe 35ᵃ in place and is provided with a tapered male end 55 which makes an effective joint with rubber hose 53. The solution being drawn from the filter frames through the perforations 56 of the pipe 35 into the pipe 49 of the beam 46. The beam 46 carrying the filter frame 33 is bored out at both ends. One end 57 (Fig. 2) is then closed and the other is fitted with a swivel and stuffing box 58 for vacuum and compressed air connections.

The beam 46 is carried by two built up rocking arms 63. These have suitable joints and members. The boss 64 of the rocking arms 63 is provided with a flange 65 at one end to bolt on to a worm wheel 66 and is formed with a collar 67 at the other end to engage with the main bearings 68. Suitable weights 69 are attached to the rocking arms 63 and are provided with slots to take the weights. The rocking arm boss 64 is securely keyed to the main shaft 70 on which latter, at either side of the machine, is the worm wheel 66 for transmitting motion to the rocker arms 63 and to which is geared a suitable worm 71 on a longitudinal shaft 72 mounted in suitable bearings on the frame or retaining wall 2. The worm wheels 66 are not keyed to the main shaft 70 but are secured by bolts and flanges 64 to the rocker arms 63.

Figure 2:
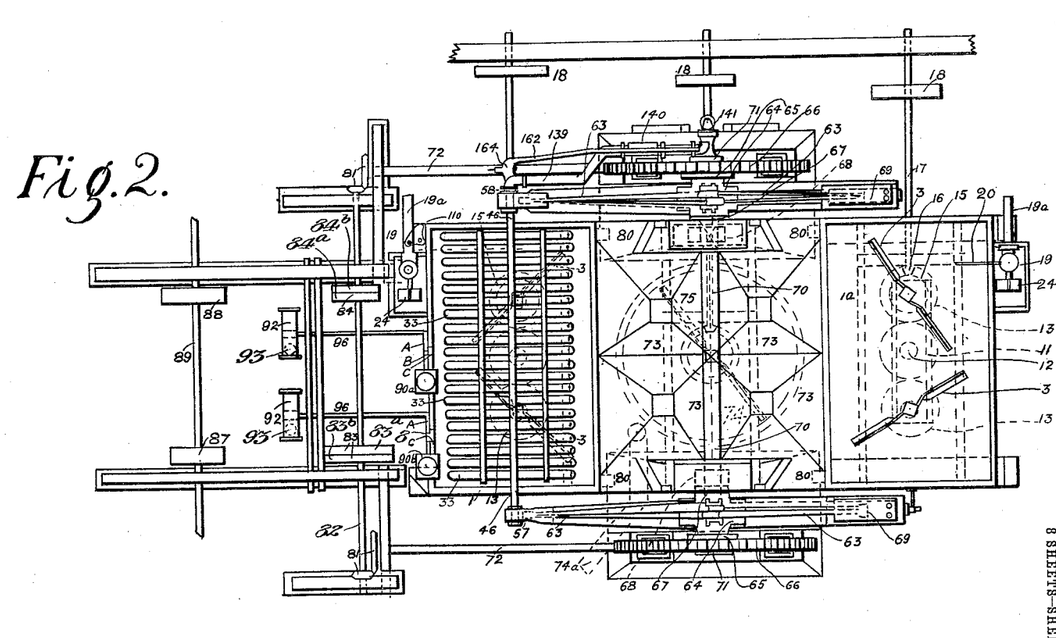
Fig. 2 a plan of the improved slimes filter.

The residues are discharged into a four part hopper 73 and thence into a circular tank 74 provided with a suitable agitator 75. A discharge or delivery pipe 74$^a$ is fitted to the residue tank 74. The said discharge tank 74 and hopper 73 should be built to fit between concrete piers 79 and the tanks 1 and 1$^a$. Wings 80 as clearly shown in Fig. 2 are carried up to catch the discharge from the end frames 33 and said wings are secured to piers 79 by suitable bolts.

Figure 1:
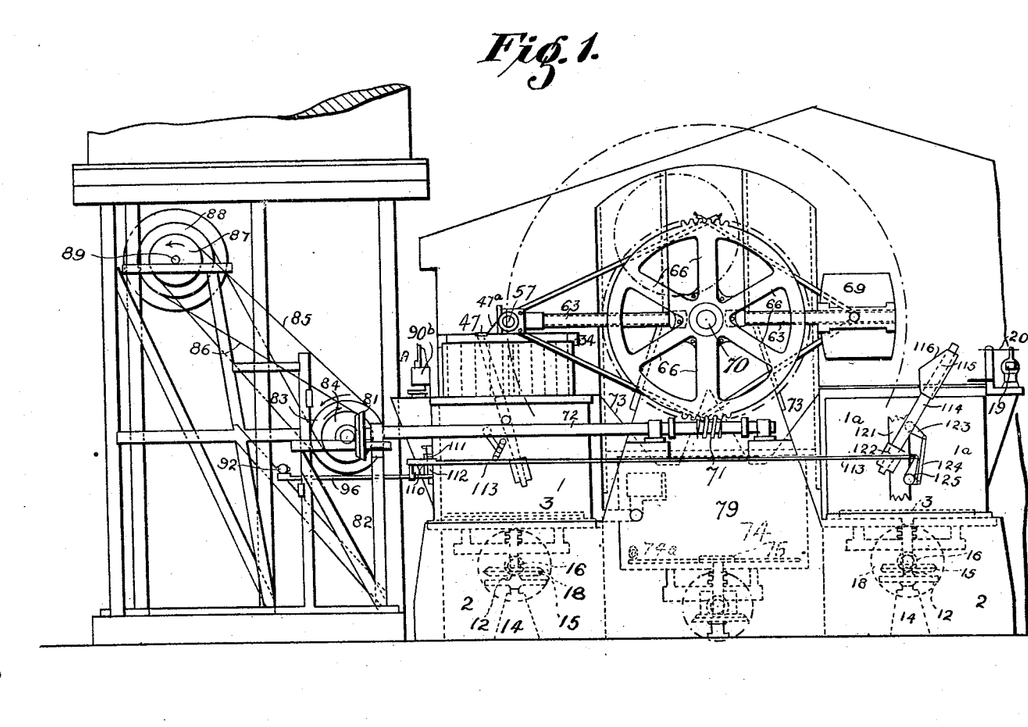
Figure 1 is a side elevation.

In the driving gear the worm wheels 66 should have a suitable speed of revolution. The worm shafts 72 are preferably carried out at end of machine and geared down three to one with bevel gear 81. These bevel gears 81 are set "in and out" as illustrated in Figs. 1 and 2 to give the same direction of rotation to the worms 71.

A transverse shaft 82 mounted in bearings on the frame at the forward end of the machine is fitted with fast and loose pulleys, two pairs 83 and 84 of different diameters are arranged to drive one with open and one with cross belt 85 and 86 respectively on two pulleys 87 and 88 on a countershaft 89 and thus give the necessary speed. The agitators 3 and 75 are preferably driven from a separate countershaft.

Automatic reversing gear and belt shifting devices are provided. The gear being actuated by the raising and lowering of suitable buckets actuating a series of trip and other levers and weights which cause a pair of shifting bars in their turn to transfer the driving belts from the fast to the loose pulleys and vice versa.

Figures 8, 9:
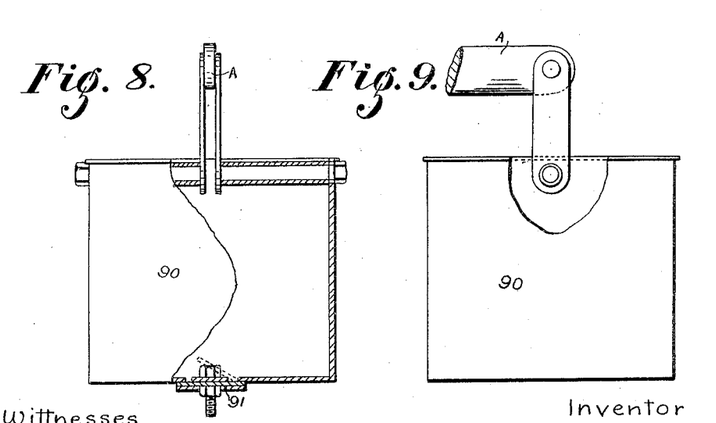
Figs. 8 and 9 show sectional elevations of buckets which form a part of the automatic reversing gears.

The automatic reversing gear is illustrated in Figs. 6, 7, 8 and 9 of the drawings. In the reversing gear the following devices are employed. Buckets 90 are constructed as illustrated in Figs. 8 and 9 being provided with a clack valve 91 for emptying them when in their lowest position. These buckets 90 are carried by arms A pivoted at B to the brackets C on the wash tank 1. (Fig. 2.) Overbalance tube 92 (Fig. 2) is provided with a ball 93 and is fastened by U bolts to bearing block on a rock shaft 96 mounted on the frame of the machine. Belt shifting bars 97, 98 (Fig. 7) are mounted in brackets or guides on suitable vertical standards 100 and said bars are provided with pins carrying ferrules or rollers 101, and 102. Belt forks 104 are provided on bars 97 and 98 consisting of pins carrying tubes or rollers. The quadrant 110 is pivoted on the vertical spindle 111 between the brackets 112 on the tank 1 and connects the pull rods 113.

Figure 6:
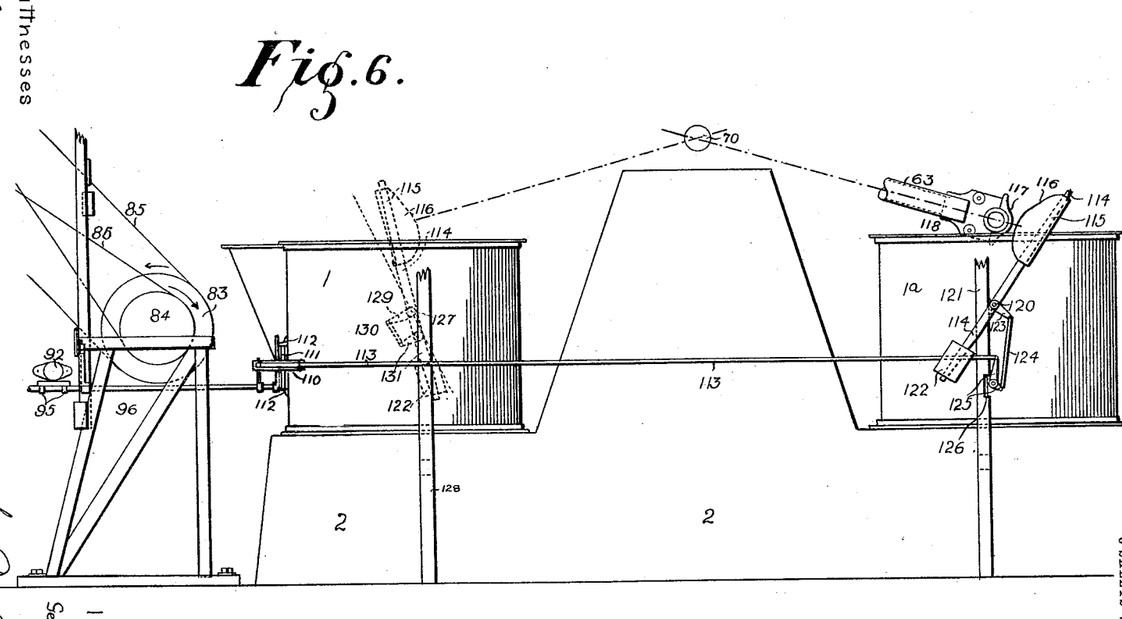
Fig. 6 is a side elevation.
Figure 7:
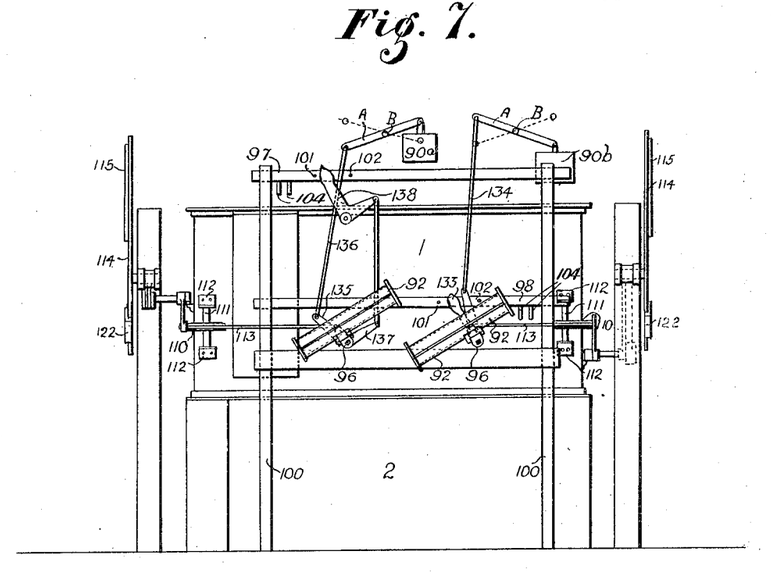
Fig. 7 a front elevation illustrating the automatic reversing gear or belt-shifting devices embodied in this invention.

Fig. 6 illustrates clearly the construction of the operating levers 114. These latter are provided with a plate 115 having a curved inner edge 116 which engages with the pin or roller 117 on the head 118 of the rocking arm 63. The normal position of said levers being shown by dotted line in Fig. 6. The plates 115 are adjustable on the levers 114 which are provided with spaced holes (Fig. 7) to allow of the adjustment.

The levers 114 are positioned on the outside of the tanks 1 and 1$^a$ as illustrated in Figs. 1, 2, and 6.

The trip lever 114 positioned outside the pulp tank 1$^a$ is fulcrumed at 120 to a vertical standard 121 and at its lower end a suitable weight 122 is attached, an arm 123 extends from the fulcrum or pivot 120 and by means of the rod 124 is connected to the bell crank 125 to which is also attached the pull rod 113, the bell crank being pivoted to the bracket 126.

The trip lever 114 positioned outside the wash tank 1 and on the opposite side of the machine is fulcrumed at 127 to the vertical standard 128 and the arm 129 on the pivot 127 by means of the short rod 130 is connected to the bell crank carrying the pull rod 113, the bell crank 131 being pivoted to a bracket on standard 128. In the drawings the machine is shown running from wash to pulp.

As the filter plates 33 settle down in pulp tank 1$^a$ the pin 117 on the head 118 of rocking arm 63 engages the curved edge of the plate 115 and operates levers 123, 124 and 125 which by means of the pull rods 113, quadrant 110, and bell crank lever 133 (Fig. 7), with connecting rod 134, pulls the bucket 90$^b$ into its raised position, as indicated in dotted lines. This action turns the overbalance tube 92 into its opposite angle throwing off the belt and setting gear ready to operate again. The bucket 90$^b$ controlling the belt shifting bar 98 is adapted to shift the belt 85 (Fig. 3) on to the fast or loose pulleys 83$^a$ or 83$^b$ (Fig. 2). The buckets are filled with water, the flow of which is regulated by a suitable cock or valve from time to time as required. The water flows out of the buckets 90$^a$ and 90$^b$ (Figs. 8 and 9) when they are in their lowest position through the clack valves 91 which are opened when the buckets fall.

As a further instance, water is flowing into the buckets 90$^a$ and when it is full it falls by its own weight and acts on a lever 135 through a rod 136 and turns the rock shaft 96 and with it its overbalance tube 92 carrying the ball weight 93, which when the tube 92 passes the horizontal rolls to the low end and causes the rock shaft 96 to turn the lever 137 and bell crank 138 which moves through the same angle as the lever 137, and in the same direction. While the bucket 90$^a$ is falling the free end of the bell crank 138 moves freely and contacts with the pin 102 on the higher slide bar 97, the weight of the ball 93 in the overbalance tube 92 is now applied and causes the slide bar 97 carrying its belt forks 104 to move to the right throwing the belt on to the fast pulley 84$^a$ (Fig. 2). The machine is now set in motion and filter plates 33 transferred from pulp to wash. As the plates settle down in tank 1 the head 118 of main rocker arm 63 acting on the said curved plate 115 reverses the action and the overbalance tube is turned over the horizontal, and the ball 93 rolls to the left hand end; the bell crank 138 engages the pin 101 which moves upper slide rod 97 to the left and throws belt on to loose pulley 84$^b$. The gear is again in position shown ready to act when bucket 90$^a$ is full. The gear controlled by the bucket 90$^b$ is free to act when said bucket is sufficiently full and transfers plates from wash to pulp, thus the length of time desired to leave the filter frames in the pulp or wash is regulated by the rate of flow of the water into the buckets. If bucket 90$^a$ is filled in ten minutes and bucket 90$^b$ in twenty minutes the frames will be in the pulp ten minutes and in the wash twenty minutes.

The vacuum and air connections and the controlling devices therefor are more especially illustrated in Figs. 10 to 14. The filter plates 33, except when the cakes are being blown off after washing, are connected to a vacuum pump (not shown) the solution passes from the plates through the beam 46 and swivel joint 58 down a pipe 139 secured to the rocking arm 63 through an automatic vacuum valve 140 to a second swivel 141 similar in construction to the swivel 58, and thence to the vacuum pump through a pipe or pipes arranged to suit the position of the machine. The axis of the swivel 141 is in line with that of the main rocker shaft 70.

The automatic vacuum valve 140 (Fig. 11) is a wing valve and is provided with inlet and outlet orifices 140$^a$ and 140$^b$. Above the valve seat are two inspection windows 145. Below the valve seat is a set of lever gear consisting of a pivoted arm 146 and the free end and enlarged head of which enters a slot in the screwed rod of the valve. On the outside of the valve is a double faced cam lever 150, the spindle 151 of which carries the rocking arm 152 which engages and controls the upward or opening movement of the lever 146 and this lever controls the opening of the vacuum valve. The cam lever is slotted at 153 and a pin 154 on a suitable bracket and carrying a spring or locking washer 154$^b$ passes therethrough and limits the movement of the lever 150 which is provided with two cam faces or tracks 155 and 156.

Figure 10:
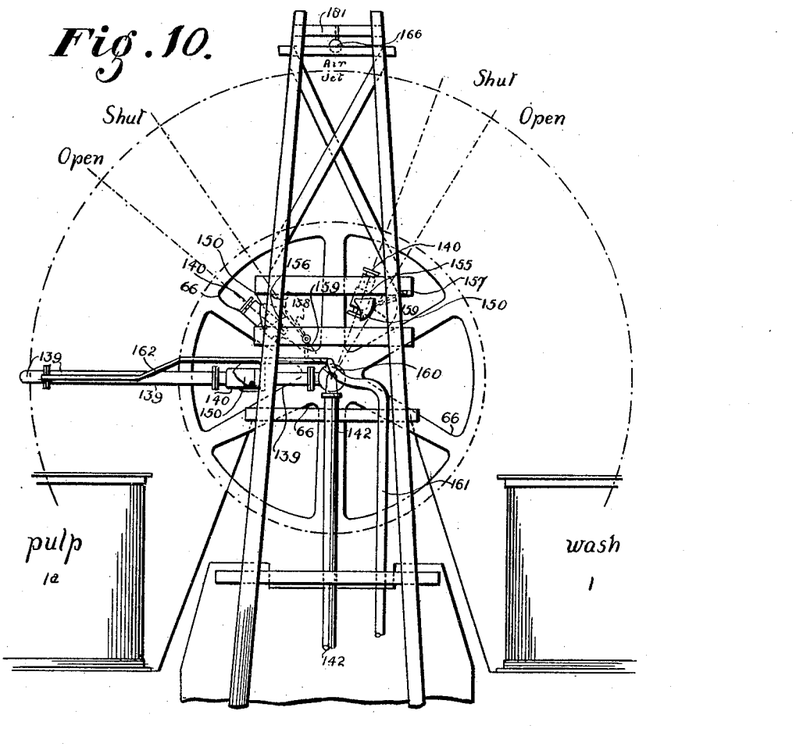
Fig. 10 is a side elevation illustrating the positions of the vacuum and compressed air valves and connections and the manner of operation.
Figure 11:
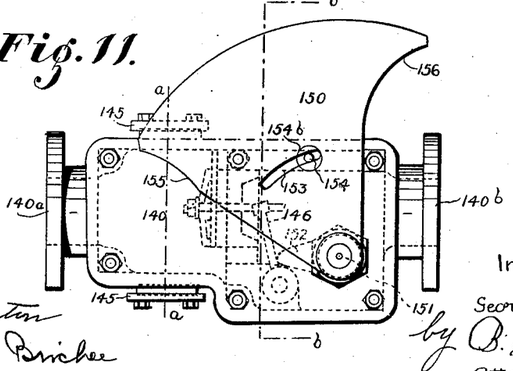
Fig. 11 is a side elevation of the vacuum valve.
Figure 12:
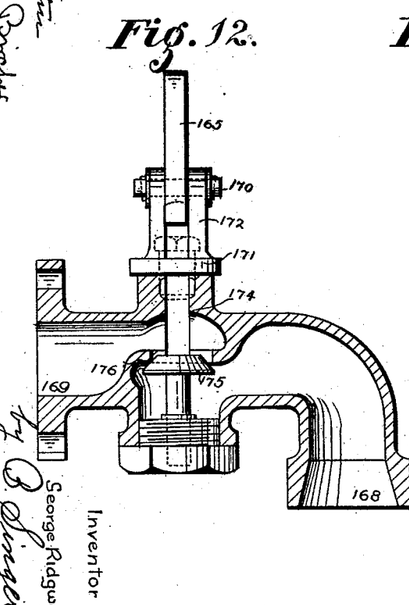
Fig. 12 is a vertical central section of the compressed air valve and Fig. 13 is an end elevation of the said air valve.
Figure 13:
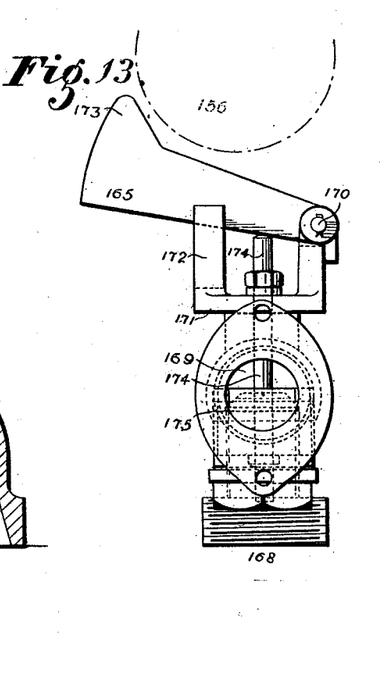
Figure 14:
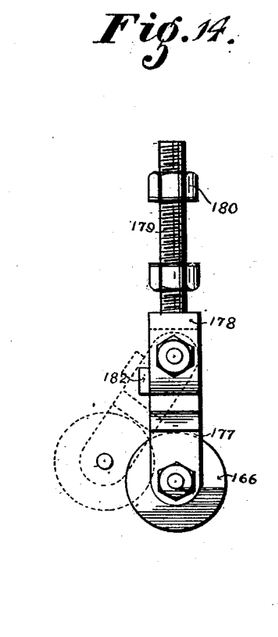
Fig. 14 a side elevation of the device or trigger adapted to control the opening of the compressed air valve.

The double faced cam lever 150 is adapted to control the opening and closing of the vacuum valve 140 and closes and reopens the valve at prearranged points so that vacuum is shut off when the compressed air is admitted to blow off the cakes. Two special trippers 157, 158 (Fig. 10) are arranged on the framing 159 and are adjustable within certain limits. These engage with the cam lever 150 when the plates 33 are traveling from wash to pulp and shut off the vacuum for a space and then reopens, the closing tripper 157 being positioned as illustrated in Fig. 10 and engages with the tracks 155 of the cam lever, while the opening tripper 158 engages with the track 156 of the lever 150 and reopens the valve. When the plates 33 are traveling in the opposite direction these trippers 157 and 158 swing clear and do not act, the trippers being pivoted and are provided with stop pins to allow of the operation of the cam lever 150.

Compressed air is used to break the vacuum and blow off the cakes as the filter plates 33 pass from wash to pulp. The compressed air is brought from any convenient supply main to a point 160 near the end of the main rocking shaft 70 by means of a flexible hose connection 161 made to an air pipe 162 leading along the rocking arm 63 to a flanged arm at the rear of swivel 58 at the end of the beam 46. At this point a compressed air valve 164 is fitted and is provided with a cam lever 165 (Figs. 12 and 13) which engages a roller 166 fixed to the framing 167 (Fig. 11) in such a way that compressed air is admitted to the filter frames and blows off the cakes which are held only by suction. When the cam lever 165 passes clear of the roller 166 the air is shut off and the vacuum valve is reopened. The roller 166 is so arranged that when the plates 33 pass from pulp to wash it does not act. The air valve 164 (Figs. 12 and 13) is provided with an inlet orifice 168 and an outlet orifice 169 which latter allows the air to pass into the pipe 49 of the beam 46 (Fig. 2) when (as in Figs. 12 and 13) the roller 166 actuates the cam lever 165 pivoted at 170 to the bracket 171 and operates within the bifurcated arms 172. The roller 166 contacts with the enlarged end 173 forming a track and when lever 165 is operated it pushes the valve rod 174 down which opens the valve 175 which is forced from its seat 176 and allows compressed air to pass to the filter plates 33. Immediately the cam lever 165 passes clear of the roller 166 the valve 175 is closed by the air pressure.

The roller 166 (Fig. 14) is rotatably mounted on the bifurcated arm 177 pivotally mounted to the depending arms 178 of the screwed rod 179 having nuts 180 with which it is securely fastened to the frame 181. The roller is so arranged that when plates pass from pulp to wash it does not act. A stop 182 being attached to the bifurcated arm 177 for this purpose.

The method of operation is as follows:— One of the tanks 1ª is filled with the pulp to be treated and the other with water or wash solution. The agitators 3 and 75 are set in motion and the vacuum admitted to the filter frames 33. The filter frames 33 are lowered into the pulp tank 1ª and the water adjustment regulated to permit of a long enough immersion to form the required thickness of cakes on the filter frames 33. The water receptacle or bucket 90ª when full sinks by the action of gravitation and moves the belt 86 on to the fast pulley 84ª bringing the worm gear into action and carrying the filter frames 33 over by a semicircular sweep and lowering them into the wash tank 1. The other water receptacle or bucket 90ᵇ having been raised by the motion of the filter frame is brought into its raised position to receive its supply of water, the valve being also regulated to permit of the required period of immersion. When the second water receptacle or bucket 90ᵇ is full, it descends and removes the other belt 85 on to the fast pulley 83ª and the filter frames 33 are carried back toward the pulp tank. At a point (Fig. 10) between the two tanks, vacuum and compressed air valves 140 and 164 contact with their respective operating devices and the vacuum valve 140 is shut for a short space of time and the air valve 164 similarly opened by means of which air pressure is admitted to the filter frames 33 and the residue cake is expelled from them, the filter frames passing on to receive another supply of pulp and the whole action is automatically repeated.

Having now fully described and ascertained my said invention and the manner in which it is to be performed I declare that what I claim is:—

1. In a slimes-filter, a plurality of tanks, agitators operating therein, filter frames, rocking arms adapted to carry said filter frames from tank to tank, gear for transmitting power from a counter-shaft to said rocking arms, a residue tank having an agitator operating therein, automatic reversing gear and belt-shifting devices, and valve and pipe connections communicating with a vacuum valve and a compressed air-valve for actuating the same and a vacuum pump, substantially as and for the purpose specified.

2. In a slimes filter, pulp and wash tanks, valves for regulating the supply of pulp thereto, a residue tank, agitators operating in said tanks, rocking arms for transferring filter-frames from tank to tank, gearing for transmitting motion to said rocking arms, a tubular beam connecting said rocker arms, filter-frames suspended from said beam and connections adapted to apply vacuum and compressed air to the interior of said filter frames, substantially as and for the purpose specified.

3. In a slimes-filter, pulp and wash tanks, filter-frames adapted to be immersed in said tanks, reciprocating arms carrying said filter-frames and the actuating devices therefor for immersing said filter-frames and transferring the same continuously from tank to tank, automatic reversing gear- and belt-shifting devices and means for shutting off the vacuum for a short period, and supplying compressed air to the filter-frames, substantially as and for the purpose specified.

4. In a slimes-filter, pulp and wash tanks, filter frames adapted to be immersed in said tanks and to be lowered and raised therein, a hopper 73 between said tanks discharging into a residue tank 74, agitators 3 and 75 operating in said tank, and a valve adapted to maintain the level of pulp and washwater in their respective tanks, and means operated by lowering and raising the filter frames for opening and closing said valve.

5. In a slimes-filter, pulp and wash tank, a plurality of filter plate frames 33 adapted to be immersed in and transferred from tank to tank, a tubular beam 46 from which said filter-frames are suspended, closed at one end and provided on its underside with holes, carrying short lengths of pipe 52 and flexible connection communicating with the interior of said filter-frames, the end of said beam having vacuum and compressed air-connections, reciprocating arms carrying said beam and its operating mechanism, substantially and for the purpose specified.

6. In a slimes-filter, rocking arms 63 carrying a tubular beam communicating with the interior of a plurality of filter-frames 33, the boss 64, of said rocking arms being keyed to the main shaft 70, a worm wheel 66 secured to said boss 64 worm wheels 71 on longitudinal shafts 72, gearing with said worm wheel 66, a bevel gear 81, a transverse shaft 82 fitted with 2 pairs of fast and loose pulleys 83, 84 driving belts 85 and 86, and pulleys 87 and 88 and counter shaft 89 and automatic reversing gear-and-belt shifting devices adapted to transfer said filter frames from pulp to wash and from wash to pulp, continuously and at prearranged periods, substantially as for the purpose specified.

7. In a slimes filter, pulp and wash tanks 1 and 1ᵃ rocking arms 63, a tubular beam 46, filter frames 33 suspended from said beam, gears for transmitting motion to said rocking arms and transferring the filter frames from tank to tank, automatic reversing gear, means for controlling the period of immersion of said filter frames in the tanks and for automatically starting and stopping the driving gear means for actuating said controlling devices by raising and lowering buckets 90, rock shafts 96 connected to said buckets, weighted, overbalanced tubes 92 carried by said shafts and controlling the belt-shifting bars 97 and 98, means for transferring the driving belts 85 and 86 from the fast and to the loose pulleys 83 and 84 on shafts 82 and vice versa by the falling of the buckets 90 and by the action of the rocking arms 63 respectively and camplates 115 on weighted levers 114 communicating with the rock shafts 96 contacting with said arms substantially as and for the purpose specified.

In testimony whereof I have signed my name to this specification in the presence of the two subscribing witnesses.

GEORGE RIDGWAY.

Witnesses:
CHARLES BUCHER,
DAVID GRIFFITHS.

---

Copies of this patent may be obtained for five cents each, by addressing the "Commissioner of Patents. Washington, D. C."